United States Patent [19]

Mang et al.

[11] Patent Number: 4,650,233

[45] Date of Patent: Mar. 17, 1987

[54] MECHANICALLY OPERABLE SUCTION DEVICE FOR LIFTING AND HOLDING OBJECTS

[75] Inventors: Paul Mang, Schmitten; Werner Joppe, Neu-Anspach; Jörn Schuch, Oberursel, all of Fed. Rep. of Germany

[73] Assignee: Mania Elektronik Automatisation Entwicklung und Gerätebau GmbH, Schmitten, Fed. Rep. of Germany

[21] Appl. No.: 797,814

[22] Filed: Nov. 13, 1985

[30] Foreign Application Priority Data

Nov. 13, 1984 [DE] Fed. Rep. of Germany ....... 3441478
Nov. 13, 1984 [DE] Fed. Rep. of Germany ....... 3441479

[51] Int. Cl.⁴ ................................................ B66C 1/02
[52] U.S. Cl. .................................. 294/64.1; 248/363; 269/21
[58] Field of Search ............................ 294/64.1–64.3, 294/65; 29/743; 248/362, 363; 269/21; 271/90, 271/91, 103, 108; 279/3; 414/627, 737, 744 B, 752

[56] References Cited

U.S. PATENT DOCUMENTS

| | | | |
|---|---|---|---|
| 3,167,326 | 1/1965 | Heessels | 248/363 X |
| 3,236,488 | 2/1966 | Wilson | 248/363 |
| 3,481,858 | 12/1969 | Fromson | 294/64.1 X |
| 3,602,543 | 8/1971 | Sjodin | 294/64.1 |
| 3,720,433 | 3/1973 | Rosfelder | 294/64.1 |

FOREIGN PATENT DOCUMENTS

| | | |
|---|---|---|
| 3101864 | 8/1982 | Fed. Rep. of Germany . |
| 3325207 | 1/1985 | Fed. Rep. of Germany . |
| 2184072 | 12/1973 | France . |
| 4840 | 1/1982 | Japan .................... 294/64.1 |
| 1589543 | 5/1981 | United Kingdom . |

*Primary Examiner*—Johnny D. Cherry
*Attorney, Agent, or Firm*—Wenderoth, Lind & Ponack

[57] ABSTRACT

A mechanically operable suction device for lifting and holding objects includes a housing having therein an intake chamber adapted to be connected to a vacuum source, an intake orifice opening into the intake chamber from the surrounding atmosphere, and a cylinder chamber. A valve member within the intake chamber is movable between a ready position sealing the intake orifice and a suction position spaced from and opening the intake orifice. A plunger is connected to the valve member and extends therefrom through the orifice. Abutting the plunger on an object to be lifted moves the valve member from the ready position to the suction position. A control piston connected to the valve member extends into and seals the cylinder chamber from the intake chamber. The control piston is movable with the valve member between first and second positions when the valve member is in the ready and suction positions thereof, respectively. A first surface area portion of the control piston is exposed to atmospheric pressure when the control piston is in the first position thereof, and a second surface area portion of the control piston is exposed to atmospheric pressure when the control piston is in the second position. The second surface area portion is smaller than the first surface area portion, and the cross-sectional area of the intake orifice is less than that of the first surface area portion and greater than that of the second surface area portion.

15 Claims, 5 Drawing Figures

MECHANICALLY OPERABLE SUCTION DEVICE FOR LIFTING AND HOLDING OBJECTS

BACKGROUND OF THE INVENTION

The present invention relates to a mechanically operable suction device for lifting and holding objects, particularly air-permeable objects.

In the art of handling objects, there exist a number of applications in which gripping elements, lifting magnets or the like cannot be employed for lifting, holding or moving objects. In such cases, resort frequently is made to vacuum-operated suction devices. Such devices, however, may present problems when the objects to be handled are at least partly permeable to air. If such objects cannot be lifted by devices other than suction devices, then the suction devices and the associated vacuum systems must be designed for air flows of considerable magnitude to ensure the creation of effective pressure differentials capable of generating forces of sufficient strength for lifting and holding the particular objects.

One example of such an application is the functional testing of pre-drilled, but as yet unassembled printed circuit boards by means of automatic circuit board testing machines. During such operation, it is desirable to lift and move without difficulty printed circuit boards consisting of a non-magnetic material so that the handling of such boards may be automated as much as possible. It of course is not possible to lift non-magnetic circuit boards by means of magnetic forces, and the use of mechanical gripping devices is not desirable since the circuit board contours and dimensions may change frequently. Thus, the logical alternative is to employ a vacuum-operated suction apparatus, but again this type of solution presents problems due to the fact that pre-drilled circuit boards are permeable to air.

Because of the substantial air flows required, it is obvious not to activate such a suction device until the pressure differential it generates is needed, i.e. at the time the device engages the object to be lifted. Also, it is desirable that the mechanisms required for activating the suction device do not unnecessarily increase the air flows which are needed in the first place.

A suction device including a plunger for mechanically activating the same is disclosed in DE-A1-No. 31 01 864, and the present invention represents an improvement of such device. In accordance with such device, a spring is used to bias a valve member toward a valve port so as to seal the port in a non-active condition of the device. In the active condition of the suction device, the spring contributes to reducing the lifting forces of the device and/or to increasing the suction air requirements of the device because the return force of the spring increases with the opening of the intake port.

SUMMARY OF THE INVENTION

With the above discussion in mind, it is an object of the present invention to provide a mechanically operable suction device for lifting and holding objects, whereby it is possible to overcome the above and other prior art disadvantages.

It is a further object of the present invention to provide such a suction device wherein a vacuum pump supplying the suction need not be stressed any more than absolutely necessary.

It is a still further object of the present invention to provide such a suction device wherein, following activation thereof, a plunger of the device will not exert any residual force on the object to be lifted.

These and other objects are achieved in accordance with the present invention by the provision of a mechanically operable suction device for lifting and holding objects, particularly air-permeable, planar objects, wherein the device includes a housing having therein an intake chamber adapted to be connected to a vacuum source, an intake orifice opening into the intake chamber from the surrounding atmosphere, and a cylinder chamber. A valve member within the intake chamber is movable between a ready position sealing the intake orifice from the surrounding atmosphere and a suction position spaced from and opening the intake orifice to the surrounding atmosphere. A plunger is connected to the valve member and extends therefrom through the intake orifice, whereby upon the plunger abutting an object to be lifted, the valve member is moved from the ready position thereof to the suction position thereof. A control piston is connected to the valve member and extends into the cylinder chamber and seals the cylinder chamber from the intake chamber. The control piston is movable with the valve member between a first position when the valve member is in the ready position and a second position when the valve member is in the suction position. There is provided means for exposing a first surface area portion of the control piston to atmospheric pressure tending to urge the control piston toward the first position thereof when the control piston is in the first position, and for exposing a second surface area portion of the control piston to atmospheric pressure tending to urge the control piston toward the first position when the control piston is in the second position. The second surface area portion is substantially smaller than the first surface area portion, and the cross-sectional area of the intake orifice is substantially less than that of the first surface area portion and substantially greater than that of the second surface area portion.

In accordance with the above arrangements of the present invention, the intake orifice of the intake or vacuum chamber is held in a sealed condition until the plunger of the device engages an object to be lifted. In response to such engagement, the plunger opens the valve member against the force of the atmospheric pressure operating on the control piston to maintain the valve member in a closed position. The sudden mechanical engagement between the plunger and the object to be lifted moves the valve member away from the intake orifice, thereby moving the control piston in the cylinder chamber. Accordingly, the atmospheric pressure initially acting on the entire surface area portion of the control piston thereafter will act only on the reduced size surface area portion of the control piston. Specifically, in accordance with the present invention a port opens into the cylinder chamber from the surrounding atmosphere, the cross-sectional area of the port being less than that of the cylinder chamber. A stud extends from the control piston, the stud sealingly extending into and closing the port when the control piston is in the second position thereof, i.e. when the valve member is in the suction position thereof. The port is open to the cylinder chamber when the control piston is in the first position thereof, i.e. when the valve member is in the ready position thereof. The cross-sectional area of the stud is substantially less than the entire cross-sectional area of the control piston including the stud. Thus, when the stud enters the port, the atmospheric pressure then acts only on the stud, i.e. on a substantially reduced cross-sectional area portion of the control piston. This closing force acting on the control piston and thus on the valve member counteracts the lower pressure existing in the intake or vacuum chamber and the dynamic pressure of air inrushing through the intake orifice and acting on the valve member. The force of the atmospheric pressure acting on the control piston will be reduced abruptly by the plunger abutting the object to be lifted and thereby moving the valve member and control piston such that the stud extends into the port. As a result, the intake orifice will be opened widely to allow the required high air flow and will remain in such position after activation until the negative pressure in the intake or vacuum chamber has been reduced to zero or even increased to positive pressure. As a result, the vacuum pump operating the device will not be stressed more than is absolutely necessary.

If a compression spring were employed, as in the prior art, for generating the closing force acting on the valve member against the negative and dynamic pressures, then the vacuum pump would have to be dimensioned to additionally overcome the closing force of the spring. Furthermore, a spring biased suction device would provide only a relatively small suction opening, whereas the suction device of the present invention, once activated, opens completely to its full size virtually instantly.

The suction device of the invention may be used to particular advantage in a handling apparatus for lifting large air-permeable objects having a variety of possible contours or sizes. To this end, a multiplicity of such suction devices would be distributed uniformly across a lifting device of large area, with only those suction devices actually contacting a particular object to be lifted being activated. In this manner, the suction air requirements and thus the power consumption of the vacuum pump could be reduced to the particular level absolutely necessary for a given lifting operation.

As will be obvious to one skilled in the art, a lifting apparatus of this type is useful for objects other than pre-drilled printed circuit boards. It is contemplated that the present invention may be employed wherever flat or planar air-permeable objects having various possible outlines and sizes and made of non-magnetic material are to be lifted and moved, within the scope of automated production systems.

BRIEF DESCRIPTION OF THE DRAWINGS

Other objects, features and advantages of the present invention will be apparent from the following detailed description of embodiments of the suction device of the present invention, a number of which may be combined to form a planar lifting apparatus, and with reference to the accompanying drawings, wherein.

DETAILED DESCRIPTION OF THE INVENTION

Figure 1:
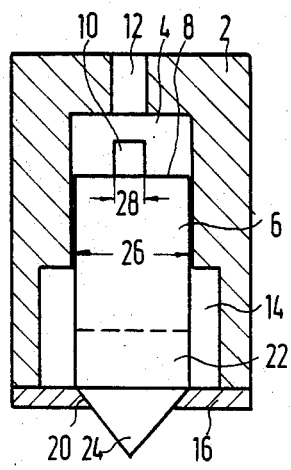
FIG. 1 is a section through a first embodiment of the suction device of the present invention, the device being shown in the inactive or non-lifting position.
Figure 2:
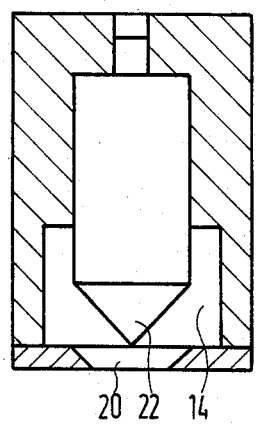
FIG. 2 is a similar view of the device of FIG. 1, but shown in the activated or lifting condition.

With reference to FIGS. 1 and 2, a first embodiment of a mechanically operable suction device according to the present invention will be described. The device includes a cylindrical valve housing 2 having therein an intake or vacuum chamber 14, an intake orifice 20 opening into intake chamber 14 from the surrounding atmosphere, and a cylinder chamber 4. Chamber 14 is adapted to be connected alternately, in a manner not explained in detail but shown schematically in FIG. 5 and which would be understood by one skilled in the art, to a source of vacuum 30 and, if necessary, to a source of higher pressure 31 such as atmospheric or super atmospheric pressure. Such connection may, for example, be achieved by way of a two-way valve 32 or similar means. A valve member 22 within chamber 14 is movable between a ready position sealing intake orifice 20 from the surrounding atmosphere, as shown in FIG. 1, and a suction position spaced from and opening intake orifice 20 to the surrounding atmosphere, as shown in FIG. 2. A plunger 24 is connected to valve member 22 and extends therefrom through the intake orifice 20 when the valve member 22 is in the ready position, as shown in FIG. 1. Upon plunger 24 abutting an object to be lifted, plunger 24 moves valve member 22 from the ready position to the suction position, whereat the suction within chamber 14, through now open orifice 20, is employed to hold and lift an object.

A control piston 6 is connected to valve member 22 and sealingly extends into cylinder chamber 4 and seals chamber 4 from chamber 14. Control piston 6 is movable with valve member 22 between a first position (shown in FIG. 1) when valve member 22 is in the ready position thereof and a second position (shown in FIG. 2) when valve member 22 is in the suction position thereof. A venting port 12 opens into cylinder chamber 4 from the surrounding atmosphere, and the cross-sectional area of port 12 is less than that of cylinder chamber 4. A stud 10 extends from control piston 6, and when control piston 6 is in the second position thereof shown in FIG. 2, then stud 10 sealingly extends into and closes port 12. When control piston 6 is in the first position thereof shown in FIG. 1, then stud 10 is withdrawn from port 12, such that chamber 4 is exposed to atmospheric pressure through port 12.

Thus, when the valve member is in the closed, ready position shown in FIG. 1, then atmospheric pressure acts on the entire cross-sectional area of control piston 6, including end face 8 and stud 10. This entire cross-sectional area of the control piston forms a first surface area portion, and the atmospheric pressure acting thereon tends to urge control piston 6 toward the first position thereof and thereby to maintain valve member 22 in the closed, ready position shown in FIG. 1. When the stud 10 extends into port 12, then the atmospheric pressure acts only on the smaller cross-sectional area of stud 10, and this smaller cross-sectional area forms a second surface area portion which is smaller than the first surface area portion. Thus when abutting engagement of plunger 24 with an object to be lifted moves the valve member, control piston and stud from the position shown in FIG. 1 to the position shown in FIG. 2, then thereafter the atmospheric pressure tending to urge such elements to their closed position is substantially less. Thus, in the position of FIG. 2, the atmospheric pressure acts only on the reduced diameter 28 of stud 10, whereas in the position of FIG. 1 atmospheric pressure acts on the entire diameter 26 of the control piston.

The cross-sectional area of intake orifice 20 is less than the cross-sectional area of end surface 8 and the end of stud 10, but is greater than the cross-sectional area of the end of stud 10 alone. Accordingly, the area of the end of stud 10 always is exposed to atmospheric pressure, but end surface 8 is only intermittently exposed to such atmospheric pressure, i.e. when the valve member 22 is in the closed, ready position shown in FIG. 1.

The device of FIGS. 1 and 2 operates in the following manner. Thus, assuming the device is in the position shown in FIG. 1, chamber 14 has applied thereto a vacuum, whereas atmospheric pressure is present in cylinder chamber 4 and on the outer side of orifice 20. As soon as plunger 24 abuts an object to be lifted, value plunger 24 urges valve member 22 and control piston 6 upwardly as shown in FIG. 2, causing stud 10 to enter and seal port 12. As a result, atmospheric pressure will now act through port 12 ony on the greatly reduced surface area portion of stud 10, so that the downward force acting on the control piston 6 will be reduced substantially,. On the other hand, the fact that valve member 22 is raised from orifice 20 causes the reduced pressure in valve chamber 14 to drop (absolute pressure rising) so that the increased pressure now present in chamber 14 generates through the upwardly facing surfaces of valve member 22 or of the control piston an upwardly directed force which cooperates with the flow surging inwardly through orifice 20 to overcome the downwardly acting force, including the weight of control piston 6 and valve member 22. As a result, the suction device then is in its activated condition shown in FIG. 2, and control piston 6 and valve member 22 will remain in their respective raised positions as shown in the drawings until the negative pressure in chamber 14 is increased to atmospheric or super atmospheric pressure by suitable means, such as the aforementioned two-way valve. As a consequence, no further air will flow through orifice 20, such that the suction acting on the lifted object will cease, thereby causing the object to drop away from the suction device. Control piston 6 and valve member 22 will drop by their own weight to seal orifice 20, whereafter negative pressure again may be applied to chamber 14. Despite the negative pressure then existing in chamber 14 and despite the atmospheric pressure acting externally at orifice 20, valve member 22 will not be raised from its closed position, since orifice 20 has a much smaller cross-sectional area than the entire cross-sectional area of control piston 6 acted on by atmospheric pressure, i.e. the area of face 8 plus the top face of stud 10.

By properly dimensioning stud 10, top control piston face 8 and intake orifice 20 with respect to each other and in relation to the atmospheric pressure and the particular vacuum pressure applied to chamber 14, it will readily be possible to ensure that valve member 22 closes intake orifice 20 in a reliable manner and remains in the active or suction position after having been opened mechanically by plunger 24 until the vacuum source is disabled and the source of over pressure is connected, in a manner as desired, to cause the negative pressure in chamber 14 to disappear.

Figure 3:
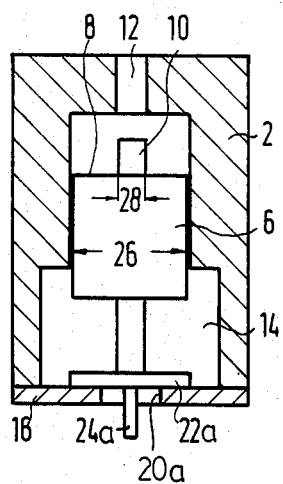

The embodiment of FIG. 3 differs from the embodiment of FIGS. 1 and 2 in that the complementary conical surfaces of orifice 20 and plunger 24-valve member 22 of FIGS. 1 and 2 are not provided. Thus, in the embodiment of FIG. 3, the valve member 22a is in the form of a plate member having a planar surface closing orifice 20a, and plunger 24a is in the form of a rod-shaped element extending through orifice 20a. The embodiment of FIG. 3 operates in the same manner as described above with regard to the embodiment of FIGS. 1 and 2.

Figure 4:
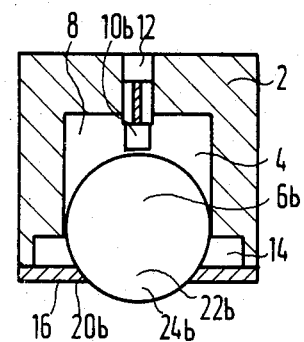
FIGS. 3 and 4 are views similar to FIG. 1, but of other embodiments of the suction device of the present invention.

The embodiment of FIG. 4 is somewhat different than the embodiments described above. Thus, in the embodiment of FIG. 4 the control piston 6b, valve member 22b and plunger 24b all are in the shape of a ball-shaped element having a spherical surface. The plunger 24b is in the form of a portion of the ball-shaped element protruding through orifice 20b. Orifice 20b is defined by a surface complementary to the spherical surface of the ball-shaped element. Furthermore, in the embodiment of FIG. 4, stud 10b is not connected to the control piston, but rather rests loosely thereon. The stud 10b includes an integral guiding projection which extends into port 12 and is guided thereby but which does not seal the port. For example, this projection may be approximately cross-shaped in horizontal cross section, so that in the position shown in FIG. 4, atmospheric pressure will continue to be introduced into chamber 4 through port 12. When the ball-shaped element is moved upwardly, in the same manner as described above, it will push stud 10b upwardly into port 12, thereby sealing and closing the port.

In accordance with a further feature of the present invention illustrated in the drawings, the intake orifice 20, 20a or 20b is formed in a valve seat plate 16 connected to housing 2. In this arrangement, it is possible to provide the valve seat plate 16 and plunger 24, 24a or 24b of an electrically non-conductive material, thereby avoiding the possibility of undersirable short circuits forming when a circuit board is being tested.

Instead of the above arrangements of the present invention, it is possible to provide the valve member with a hemispherical surface sealing intake orifice, with the plunger then being in the form of a portion of the hemispherical surface protruding through the orifice, for example in the manner shown by the bottom portion of the ball-shaped element in FIG. 4.

In the embodiments of FIGS. 1 and 4, orifices 20 and 20b are defined by surfaces complementary to conical or shperical valve member surfaces. In the embodiment of FIG. 3 however, a planar surface of valve member 22a simply abuts an inner surface of plate 16, thereby closing orifice 20a.

One advantage of a lifting apparatus based on the principle of the suction device of the present invention is that the number of suction device valves which are opened mechanically is limited to the number actually needed by the contour of a particular object, such as a pre-drilled printed circuit board, to be lifted. The remainder of the intake orifices provided in such a lifting apparatus, which may be much larger than the size of the object to be lifted, will not be opened since the respective plungers thereof will not engage the object and thus are not moved to the opened positions thereof. As a result, such a lifting apparatus may adapt itself automatically to the contour and size of a particular object to be lifted, and the vacuum pump employed to provide a vacuum in the valve chambers 14 will be loaded only to the extent absolutely necessary.

Another advantage of a lifting apparatus employing the devices of the present invention is that compression spring biasing is not required to maintain the valve member in its closed, ready position sealing the intake orifice, despite the negative pressure existing in chamber 14. Such a compression spring would be disadvantageous in that the vacuum pump used for generating the negative pressure in chamber 14 would have to supply not only the negative pressure for attracting and holding the perforated circuit board to be lifted, but also a force necessary to compress the spring which constantly urges the valve member toward the position sealing the orifice.

Figure 5:
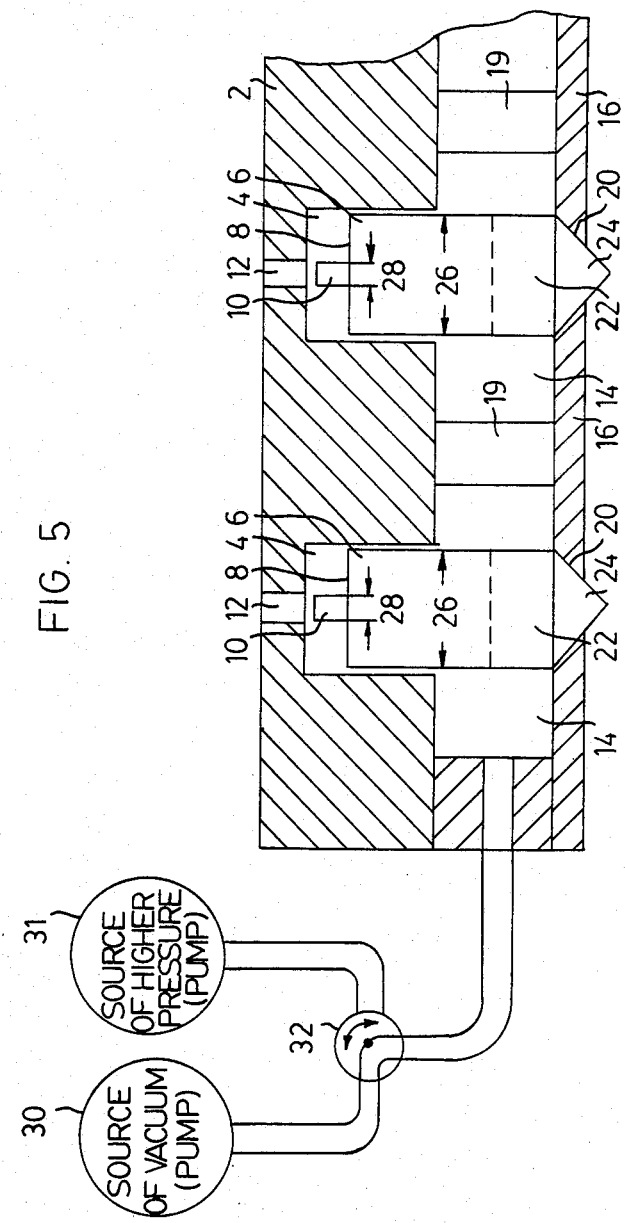
FIG. 5 is a section through an arrangement of plural suction devices of the type shown in FIG. 1, and also schematically showing connection to a source of vacuum and to a source of higher pressure.

FIGS. 1-4 show only a single valve member-control piston arrangement. It would be obvious to one skilled in the art that the device of the present invention may comprise a plurality of such control valves uniformly distributed over the total surface area of a lifting apparatus. In one practical embodiment, an apparatus of a side of 600 by 600 millimeters includes a total of 36 such control valves. Thus, FIG. 5 shows a pair of devices as shown in FIG. 1 positioned between a valve housing 2 and a plate 16, each such device being operable individually in the manner indicated above. A source of vacuum 30 or a source of higher pressure 31 are connectable alternatively, via a two way valve 32, to chambers 14 of the respective devices. Thus, a conduit leading from valve 32 can extend through a part 18 of housing 2 to communicate with one chamber 14, all of the chambers 14 being connected by openings through spacers 19. It is to be understood however that this arrangement is intended to be schematic and exemplary only. Those skilled in the art readily would understand how to adapt the present invention to provide a device including a great plurality of control valves as disclosed herewith.

It is contemplated to be within the scope of the present invention to employ a suction device or lifting apparatus assembled in a position inverted by 180° from the position shown in the drawings such that the orifice faces upwardly. This may be useful for retaining or fixing objects placed thereover. In such an arrangement, the suction device might include a very weak compression spring just strong enough to slightly over compensate the intrinsic weight of the control piston, the valve member and the plunger, so that in the operating position of the suction device the valve member may return by itself to the ready position.

Although the present invention has been described and illustrated with respect to preferred embodiments thereof, it will be apparent that various modifications and changes may be made thereto as would be understood by one skilled in the art, without departing from the scope of the present invention.

We claim:

1. A mechanically operable suction device for lifting and holding objects, said device comprising:

a housing having therein an intake chamber adapted to be connected to a vacuum source, an intake orifice opening into said intake chamber from the surrounding atmosphere, and a cylinder chamber;

a valve member within said intake chamber and movable between a ready position sealing said intake orifice from the surrounding atmosphere and a suction position spaced from and opening said intake orifice to the surrounding atmosphere;

plunger means, connected to said valve member and extending therefrom through said intake orifice for, upon abutting an object to be lifted, moving said valve member from said ready position to said suction position;

a control piston connected to said valve member and extending into said cylinder chamber and sealing said cylinder chamber from said intake chamber, said control piston being movable with said valve member between a first position when said valve member is in said ready position and a second position when said valve member is in said suction position;

means for exposing a first surface area portion of said control piston to atmospheric pressure tending to urge said control piston toward said first position when said control piston is in said first position and for exposing a second surface area portion of said control piston to atmospheric pressure tending to urge said control piston toward said first position when said control piston is in said second position, said second surface area portion being smaller than said first surface area portion; and the cross-sectional area of said intake orifice being less than that of said first surface area portion and greater that that of said second surface area portion.

2. A device as claimed in claim 1, wherein said exposing means comprises a port opening into said cylinder chamber from the surrounding atmosphere, the cross-sectional area of said port being less than that of said cylinder chamber, and a stud extending from said control piston, said stud sealingly extending into and closing said port when said control piston is in said second position, and said port being open to said cylinder chamber when said control piston is in said first position, the cross-sectional area of said stud comprising said second surface area portion, and the entire cross-sectional area of said control piston, including that of said stud, comprising said first surface area portion.

3. A device as claimed in claim 2, wherein said stud is fixed to said control piston.

4. A device as claimed in claim 2, wherein said stud loosely rests on said control piston and includes an integral guiding projection extending into but not sealing said port.

5. A device as claimed in claim 1, wherein said valve member and said control piston comprise an integral cylindrical element.

6. A device as claimed in claim 1, wherein said valve member and said plunger means comprise an integral conical element having a conical surface sealing said intake orifice, with the apex of said conical element extending through said intake orifice and forming said plunger means.

7. A device as claimed in claim 6, wherein said intake orifice is defined by a surface complementary to said conical surface.

8. A device as claimed in claim 1, wherein said valve member includes a hemispherical surface sealing said intake orifice, and said plunger means comprises a portion of said hemispherical surface protruding through said intake orifice.

9. A device as claimed in claim 8, wherein said intake orifice is defined by a surface complementary to said hemispherical surface.

10. A device as claimed in claim 1, wherein said control piston and said valve member comprise an integral ball-shaped element having a spherical surface sealing said intake orifice, and said plunger means comprises a portion of said ball-shaped element protruding through said intake orifice.

11. A device as claimed in claim 10, wherein said intake orifice is defined by a surface complementary to said spherical surface.

12. A device as claimed in claim 1, wherein said valve member has a planar surface abutting said housing to close said intake orifice, and said plunger means comprises a rod-shaped element protruding through said intake orifice.

13. A device as claimed in claim 12, wherein said valve member comprises a plate-shaped element.

14. A device as claimed in claim 1, wherein said intake orifice is formed in a valve seat plate connected to said housing, and said valve seat plate and said plunger means are formed of electrically non-conductive material.

15. A vacuum operated apparatus for lifting air-permeable planar objects having a variety of possible contours, particularly pre-drilled printed circuit boards, said apparatus comprising a plurality of uniformly distributed suction devices as claimed in claim 1.

* * * * *